United States Patent
Marra et al.

(10) Patent No.: US 9,262,936 B2
(45) Date of Patent: Feb. 16, 2016

(54) DETERMINING INDIVIDUALS FOR ONLINE GROUPS

(71) Applicant: Google Inc., Mountain View, CA (US)

(72) Inventors: Gregory Matthew Marra, San Francisco, CA (US); Frances Bordwell Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/025,704

(22) Filed: Sep. 12, 2013

(65) Prior Publication Data

US 2014/0162235 A1 Jun. 12, 2014

Related U.S. Application Data

(60) Provisional application No. 61/734,352, filed on Dec. 6, 2012.

(51) Int. Cl.
G09B 7/00 (2006.01)

(52) U.S. Cl.
CPC .......................... *G09B 7/00* (2013.01)

(58) Field of Classification Search
USPC ............. 705/14.71, 44, 14.66, 26.2, 27.1, 39, 705/14.27, 14.29, 14.43, 14.45, 14.46, 705/14.58, 14.64, 14.73, 2, 26.3, 26.4, 311, 705/321, 325, 5, 7.29, 319, 21
See application file for complete search history.

(56) References Cited

U.S. PATENT DOCUMENTS

| | | | |
|---|---|---|---|
| 7,159,178 B2 | 1/2007 | Vogt et al. | |
| 7,716,149 B2 * | 5/2010 | Ducheneaut et al. | 706/45 |
| 8,457,979 B2 * | 6/2013 | Kurtzig et al. | 705/1.1 |
| 2008/0205295 A1 * | 8/2008 | Saba | 370/254 |
| 2011/0276396 A1 * | 11/2011 | Rathod | 705/14.49 |
| 2011/0289432 A1 * | 11/2011 | Lucas | 715/753 |
| 2012/0209832 A1 * | 8/2012 | Neystadt et al. | 707/723 |
| 2012/0244500 A1 | 9/2012 | Marinescu et al. | |
| 2012/0296969 A1 * | 11/2012 | Howard | 709/204 |
| 2013/0254283 A1 * | 9/2013 | Garcia-Martinez et al. | 709/204 |

FOREIGN PATENT DOCUMENTS

JP 3892815 B2 3/2007
KR 10-2011-0087636 8/2011

* cited by examiner

*Primary Examiner* — Mark A Fleischer
(74) *Attorney, Agent, or Firm* — McDermott Will & Emery LLP

(57) ABSTRACT

The disclosed subject matter relates to encouraging an individual to assume a leadership role associated with an online group relating to a subject matter. In one innovative aspect, the disclosed subject matter can be embodied in a method. The method includes determining a leadership score corresponding to an individual. The leadership score corresponds to a level of correlation between the individual and a leadership role associated with an online group relating to a subject matter. The method further includes providing, based on the leadership score, an invitation to be sent to the individual, inviting the user to assume a leadership role associated with the online group. The method further includes receiving an indication of an acceptance of the invitation. The method further includes assigning to the individual, based on the received indication of the acceptance, the leadership role associated with the online group relating to the subject matter.

18 Claims, 5 Drawing Sheets

DETERMINING INDIVIDUALS FOR ONLINE GROUPS

CROSS-REFERENCES TO RELATED APPLICATIONS

The present application claims the benefit of U.S. Provisional Patent Application Ser. No. 61/734,352 titled "Determining Individuals for Online Groups," filed on Dec. 6, 2012, which is hereby incorporated by reference in its entirety for all purposes.

BACKGROUND

The present disclosure generally relates to online groups, and in particular to encouraging individuals to assume a leadership role in online groups relating to a subject matter.

SUMMARY

In one innovative aspect, the disclosed subject matter can be embodied in a method. The method includes determining a leadership score corresponding to an individual. The leadership score corresponds to a level of correlation between the individual and a leadership role associated with an online group relating to a subject matter. The method further includes providing, based on the leadership score, an invitation to be sent to the individual. The invitation is for assuming the leadership role associated with the online group relating to the subject matter. The method further includes receiving indication of an acceptance of the invitation for assuming the leadership role associated with the online group relating to the subject matter. The method further includes assigning to the individual, based on the received indication of acceptance, the leadership role associated with the online group relating to the subject matter.

These and other embodiments can include one or more of the following features. The method can further comprise providing for sending to an administrative user, the leadership score of the individual, and information used in the determination of the leadership score. The method can further include receiving an indication of administrative approval by the administrative user. The method can further include finalizing based on the indication of administrative approval, the assignment of the leadership role to the individual. The leadership score corresponding to the individual can be based on a subject matter expertise score, a subject matter interest score, an opinion impact score, or an online activity corresponding to the individual. The subject matter expertise score can correspond to a level of the individual's expertise in the subject matter. The subject matter expertise score can be based on the level of correlation between the subject matter and a professional designation of the individual. The subject matter expertise score can be based on a publication, relating to the subject matter, authored by the individual. The subject matter expertise score can be based on a published quote, attributed to the individual, in a publication. The reputation of the publication can also be factored in to the subject matter expertise score corresponding to the individual. The subject matter interest score corresponds to a level of the individual's interest in the subject matter. The subject matter interest score corresponding to the individual can be based on the level of correlation between the subject matter, and a link shared by the individual. The subject matter interest score can be based on a level of correlation between a first subject matter and a second subject matter, wherein a first online group relates to the first subject matter, and the second online group relates to the second subject matter, and the individual is a member of each of the online groups. The opinion impact score of an individual corresponds to a level of impact of an opinion of the individual. The opinion impact score can be based on the number of subscribers of an online account of the individual. The opinion impact score can be based on the number of times that a link shared by the individual is re-shared by the subscribers of the individual's online account. The online activity score of the individual corresponds to a level of online activity of the individual. The online activity score can be based on the frequency with which the individual connects to the Internet. The online activity score can be based on a level of interaction of the individual with the social media platform. The online activity score can also be based on reporting by the individual of inappropriate content on the social media platform.

In another innovative aspect, the disclosed subject matter can be embodied in a system. The system includes a memory which includes instructions for encouraging a social media user to assume a leadership role in a social media group relating to a subject matter, and a processor. The processor is configured to determine a leadership score corresponding to the social media user. The leadership score corresponds to a level of correlation between the social media user and the leadership role associated with the social media group relating to a subject matter. The processor is further configured to provide, based on the leadership score, an invitation to be sent to the social media user. The invitation is for assuming the leadership role associated with the social media group relating to the subject matter. The processor is further configured to receive an indication of an acceptance of the invitation for assuming the leadership role associated with the social media group relating to the subject matter. These and other embodiments can include one or more of features described above with respect to the method.

In another innovative aspect, the disclosed subject matter can be embodied in a machine-readable storage medium including machine-readable instructions for causing a processor to execute a method. The method includes determining a leadership score corresponding to the social media user. The leadership score corresponds to a correlation of the social media user and a leadership role associated with the social media group relating to a subject matter. The method further includes providing, based on the leadership score, and an indication of administrative approval, an invitation to be sent to the social media user. The invitation is for assuming the leadership role associated with the social media group relating to the subject matter. The method further includes receiving indication of an acceptance of the invitation for assuming the leadership role associated with the social media group relating to the subject matter. The method further includes assigning to the social media user, based on the received indication of the acceptance, the leadership role associated with the social media group relating to the subject matter. These and other embodiments can include one or more of the features described above with respect to the method.

Advantageously, the subject technology can improve the quality of content or discussions in an online group by encouraging individuals who are knowledgeable about, interested in, or influential with respect to a subject matter, to assume a leadership role in the online group.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Online groups can relate to a variety of subject matters. However, not every online group includes discussions or content that is relevant or of a high quality. In some instances, this can be because the group leaders or administrators are not themselves particularly interested in or knowledgeable about the subject matter.

In some instances, an individual who is indeed interested in, knowledgeable about, or influential with respect to the same subject matter may not be the leader (e.g., administrator, moderator) of an online group. For example, the individual may feel hesitant to start their own online group, and may simply need a nudge. Or, the individual may be a member of the online group but not have the ability (e.g., due to a lack of administrative privileges) to curate the content or manage users therein.

The subject disclosure describes systems and techniques for encouraging an individual to assume a leadership role associated with an online group relating to a subject matter.

Figure 1:
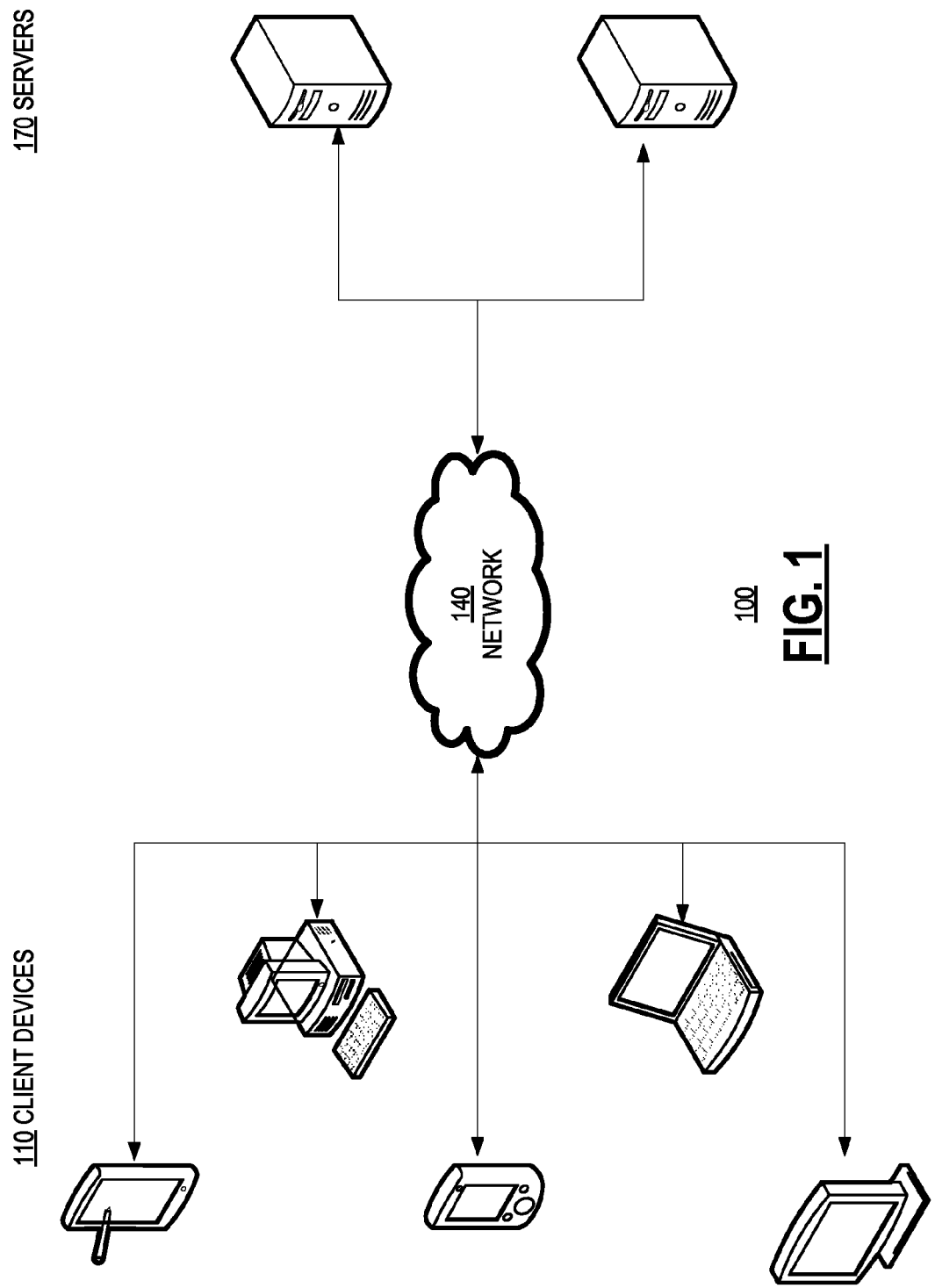
FIG. 1 illustrates an example of an architecture for encouraging an individual to assume a leadership role associated with an online group relating to a subject matter.

FIG. 1 illustrates an example of an architecture 100 for encouraging an individual to assume a leadership role associated with an online group relating to a subject matter. The architecture 100 includes client computing devices 110 and servers 170 connected over a network 140.

The term "online group" as used herein encompasses its plain and ordinary meaning, including, but not limited to a group on a social media platform (e.g., a social media group), a forum, a content aggregation website, or a user-generated content website. The term "leadership role" as used herein encompasses its plain and ordinary meaning, including but not limited to abilities, powers, responsibilities that may be assigned to an individual who may moderate, curate, contribute, or otherwise manage users, privileges, settings, content, and the like within a preexisting group, or a new group.

The client computing devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory.

The client computing devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

The client computing device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client computing device 110. The output device 204 can be a display screen. Input 206 received via the input device 202 can be processed locally on the client computing device 110 and/or the server 170.

The client computing device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which can be used by a user to interact with the computing device 110 and/or the server 170, and can be used to display information to the user. The graphical user interface 250 may be installed locally at the computing device 110 and/or downloaded from the server 170. The memory 240 further includes software instructions 242 that can be read by the processor 220 to enable interaction with the server 170. For example, the software instructions 242 can include an operating system or an application (e.g., a web browser) that can be processed by the processor 220. Data generated or stored at the client computing device 110 can be stored as data 244.

The server 170 includes a memory 280, a processor 260, and a communications module 262. The memory 280 includes software instructions that can be read by the processor 260 to implement an encouragement module 282.

The encouragement module 282 determines a leadership score corresponding to an individual. The leadership score corresponds to a level of correlation between the individual and a leadership role associated with an online group relating to a subject matter. Based on the leadership score, the encouragement module 282 provides an invitation to be sent to the individual. The invitation is for assuming the leadership role associated with the online group relating to the subject matter. The encouragement module 282 receives an indication of an acceptance of the invitation for assuming the leadership role associated with the online group relating to the subject matter. Based on the received indication of acceptance, the encouragement module 282 assigns to the individual, the leadership role associated with the online group relating to the subject matter.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions received from the memory 280, or a combination of both. As an example, the processor 260 of the server 170 executes instructions for encouraging an individual to assume a leadership role associated with an online group relating to a subject matter.

Once the instructions from the memory 280 are loaded, the processor 260 is configured to determine a leadership score corresponding to an individual. The leadership score corresponds to a level of correlation between the individual and a leadership role associated with an online group relating to a subject matter. Based on the leadership score, the processor 260 provides an invitation to be sent to the individual. The invitation is for assuming the leadership role associated with the online group relating to the subject matter. The processor 260 receives an indication of an acceptance of the invitation for assuming the leadership role associated with the online group (e.g., social media group) relating to the subject matter. Based on the received indication of acceptance, the processor 260 assigns to the individual, the leadership role associated with the online group relating to the subject matter.

Figure 3:
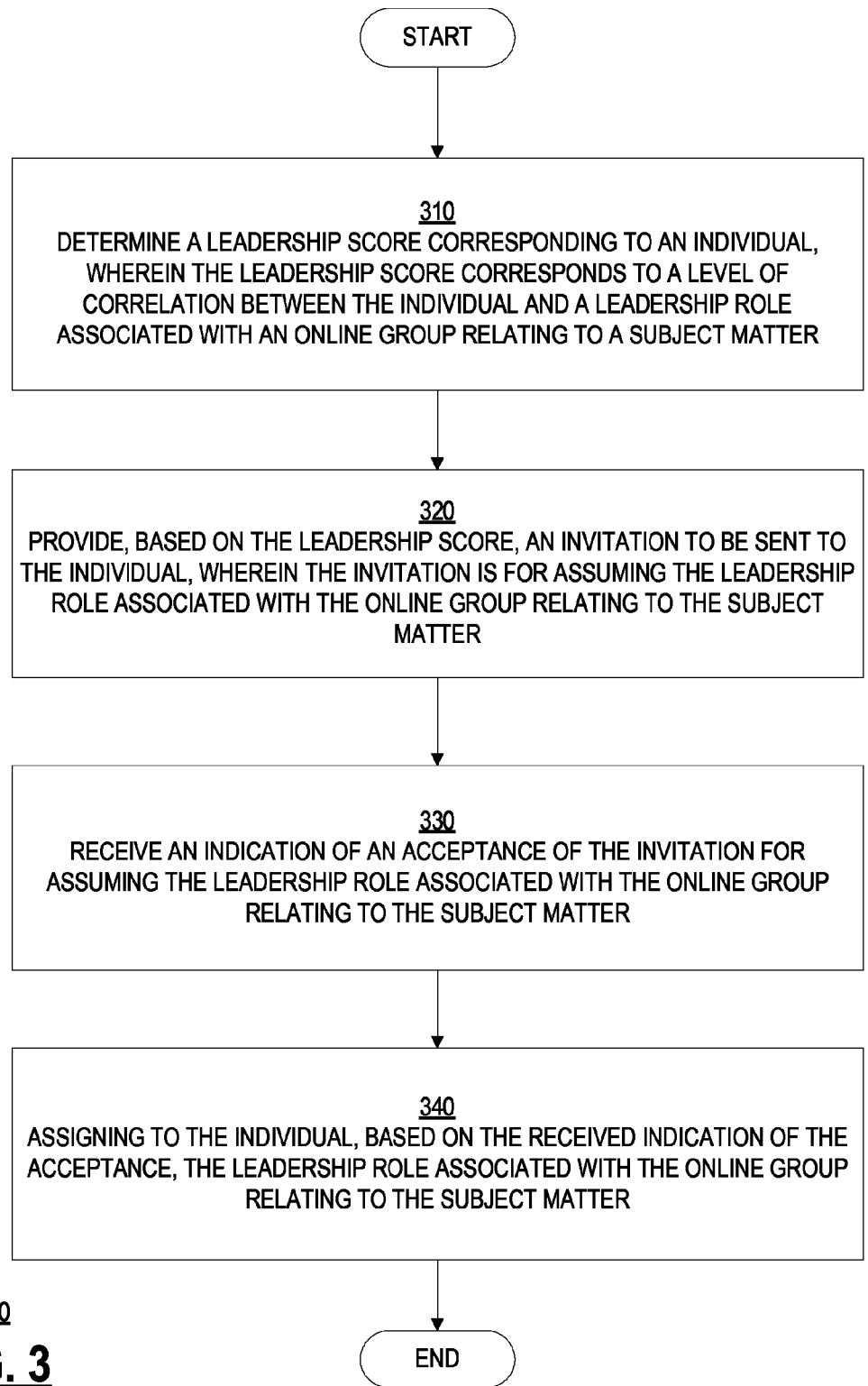
FIG. 3 illustrates an example of a process for encouraging an individual to assume a leadership role associated with an online group relating to a subject matter.

FIG. 3 illustrates an example of a process 300 for encouraging an individual to assume a leadership role associated with an online group relating to a subject matter.

In step 310, a leadership score corresponding to an individual is determined. The leadership score corresponds to a level of correlation between the individual and a leadership role associated with an online group relating to a subject matter.

The leadership score corresponding to the individual can be based on a subject matter expertise score, a subject matter interest score, an opinion impact score, or an online activity score corresponding to the individual.

The subject matter expertise score corresponds to the individual's level of expertise in the subject matter. The subject matter expertise score can be based on the level of correlation between the subject matter and a professional designation of the individual in real life.

For example, an individual who is a medical doctor may have a higher level of correlation with subject matter such as for example, medications, illnesses, health conditions, and in general other health-related topics. However, the medical doctor would have a lower level of correlation with subject matter, such as for example, water sports.

An individual's professional designation in real life can be determined based on information they have voluntarily shared, for example, on a public webpage, a social network, a resume posted online (e.g., on a job search website), professional databases (e.g., referral databases for doctors, lawyers, and the like), their e-mail signature, the domain name of their e-mail address, or any number of similar indicators. Collectively, the one or more indicators can be used to determine an individual's professional designation in real life.

Similarly, the subject matter of the online group can be determined based on the content posted or discussed within the group, description of the group, categorization of the group by a search engine, references to the group by other websites dedicated to a particular subject matter, and so on.

The subject matter expertise score of the individual can also be based on a publication, relating to the subject matter, authored by the individual. For example, an individual who publishes a scientific paper on a particular subject matter, would have a higher subject matter expertise score relating to the subject matter of that scientific paper.

The subject matter expertise score can be based on a published quote, attributed to the individual, in a publication. For example, if words spoken or written by the individual are quoted or cited in a publication, the subject matter expertise score of that individual may be higher with respect to the subject matter to which the quote relates. For example, if marriage advice provided by an individual is quoted in a magazine, that individual's subject matter expertise relating to marital issues would be increased.

In determining the subject matter expertise score based on a publication, the reputation of that publication can also be considered. For example, publication of the quote in a gossip magazine may not cause as great an increase in the subject matter score of the individual, as a publication of the quote in a psychology textbook relating to marital issues.

The subject matter interest score corresponds to a level of the individual's interest in the subject matter. The subject matter interest score corresponding to the individual can be based on the level of correlation between the subject matter, and a link shared by the individual. For example, if the individual posts or otherwise shares a link to an article relating to a particular subject matter, the individual's subject matter interest score can be increased with respect to that subject matter.

In a case where the individual is a member of two or more online groups, the subject matter interest score can be based on a level of correlation between the subject matter of the groups to which the individual belongs. For example, in a case where a first online group relates to a first subject matter, and a second online group relates to a second subject matter, and the two subject matters are related, the individual's subject matter interest score with respect to that subject matter can be increased. As an example, in a case where an individual is a member of an online group relating to healthy eating, and an online group relating to low fat diets, the individual's subject matter score with respect to nutritional topics may be increased.

The opinion impact score of an individual corresponds to a level of impact of an opinion of the individual. The opinion impact score can be based on the number of subscribers of an online account of the individual. For example, with respect to a microblogging platform, the opinion impact score can be based on the number of accounts that follow the individual's updates. As another example, with respect to a website with an RSS feed, the opinion impact score can be based on the number of accounts that are subscribed to the feed. Similarly, with respect to a social media platform, the number of accounts connected to the individual's account, can be considered.

Various statistics (e.g., about the subscribers, the individual's posts, updates, etc.) can also be used to determine the opinion impact score. For example, the opinion impact score can be based on the number of times that a link shared by the individual is re-shared by the subscribers of the individual's online account. Similarly, the opinion impact score can be based on the number of unique accounts that endorse or approve of the content (e.g., link, status update, post, comment, etc.) shared by the individual.

The online activity score of the individual corresponds to a level of online activity of the individual. The online activity score can be based on the frequency with which the individual connects to the Internet. The frequency with which the individual connects to the Internet can be determined based on how often they sign in to a service, for example, e-mail, a social network, and so on.

The online activity score can be based on a level of interaction of the individual with the social media platform. The interaction can include viewing (e.g., reading), generating (e.g., writing), or endorsing (e.g., expressing appreciation) content on a social media platform. The interaction can also include reporting content as inappropriate. An individual who performs these activities more frequently would have a higher online activity score than an individual who does the same less frequently.

Reporting inappropriate content can be given separate or additional consideration. For example, a user who reports inappropriate content may prove to be more engaged and responsible as a leader of an online group, than a user who does not.

In step 320, based on the individual's leadership score, an invitation to be sent to the individual can be provided. The invitation is for assuming the leadership role associated with the online group relating to the subject matter.

The invitation can be in the form of an e-mail, a social media message, a text message, or the like. The invitation can include an explanation of how or why the individual was selected to assume a leadership position with respect to the online group. If the individual is nominated by another person, that person's information can be included in the message.

In step 330, an indication of an acceptance of the invitation is received. The indication can be based on a variety of actions that can be performed by the individual. For example, the individual can click on a button to accept the invitation.

In step 340, based on the received indication of the acceptance, the leadership role associated with the online group can be assigned to the individual.

Figure 2:
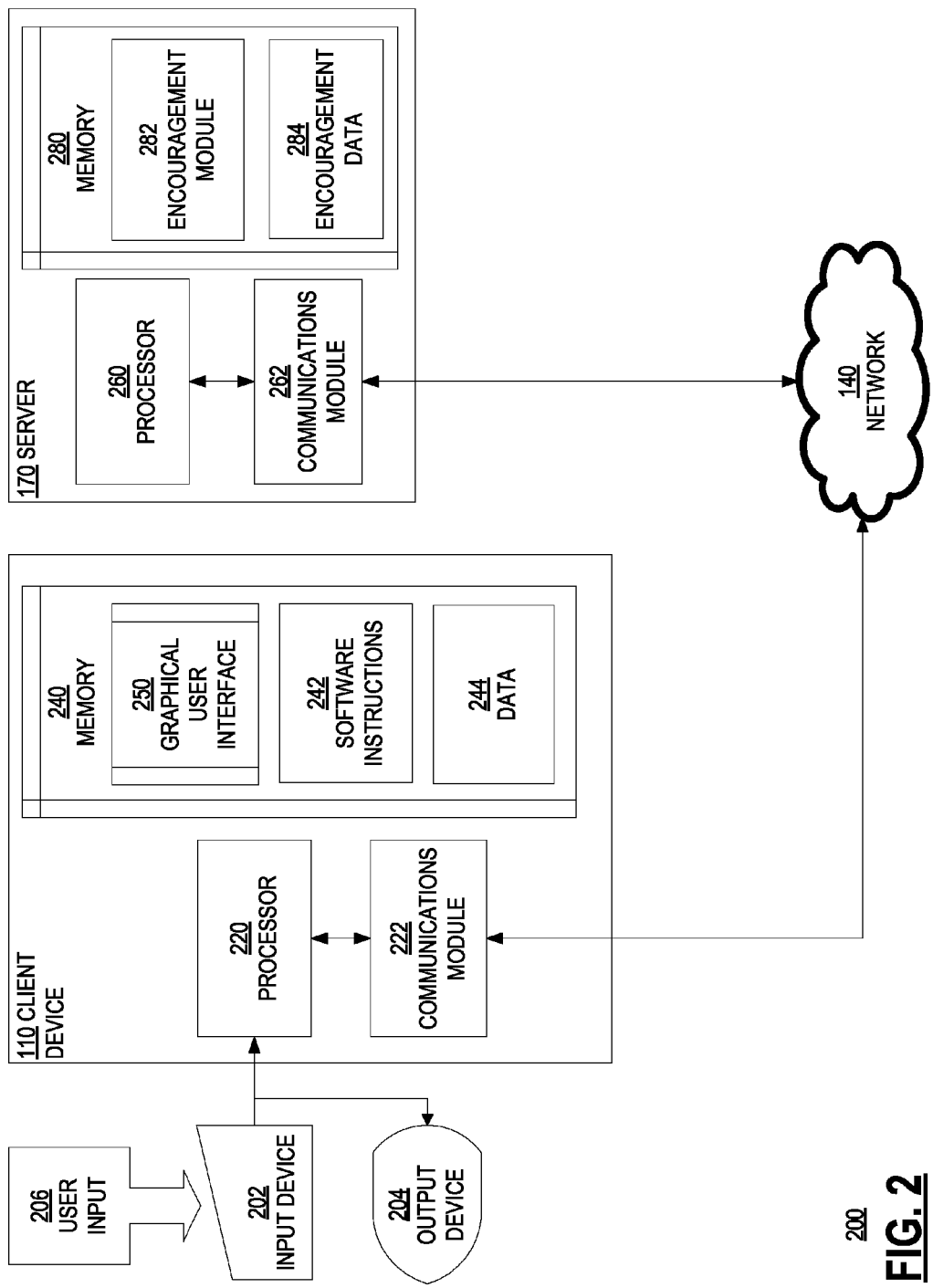
FIG. 2 is a block diagram illustrating an example of a client computing device and a server from the architecture of FIG. 1.

It should be noted that although process 300 is described herein with reference to the systems of FIGS. 1 and 2, process 300 is not limited to such, and can be performed by other systems and/or configurations. For example, in certain implementations, safeguards against sending invitations to individuals, or creation of online groups can be implemented.

As an example of such a safeguard, the subject matter identified in Step 310 can be checked against a known database of topics (subject matters) that may be considered objectionable, or otherwise inappropriate for the online group. As an example, subject matter that is not protected as free speech under the U.S. Constitution, or relates to criminal activity, can be automatically detected.

As another example of a safeguard, an additional step of review performed by a human can be implemented. In this implementation, information used to determine the individual's leadership score, the individual's leadership score, or any additional information about the individual can be sent to a human reviewer. The human reviewer can review the information and provide administrative approval.

An indication of this administrative approval can form the basis for proceeding with the preceding steps. For example, the administrative approval can form the basis for sending the invitation of Step 320, for finalizing creation of the online group in Step 340, or otherwise aborting the process 300.

Figure 4:
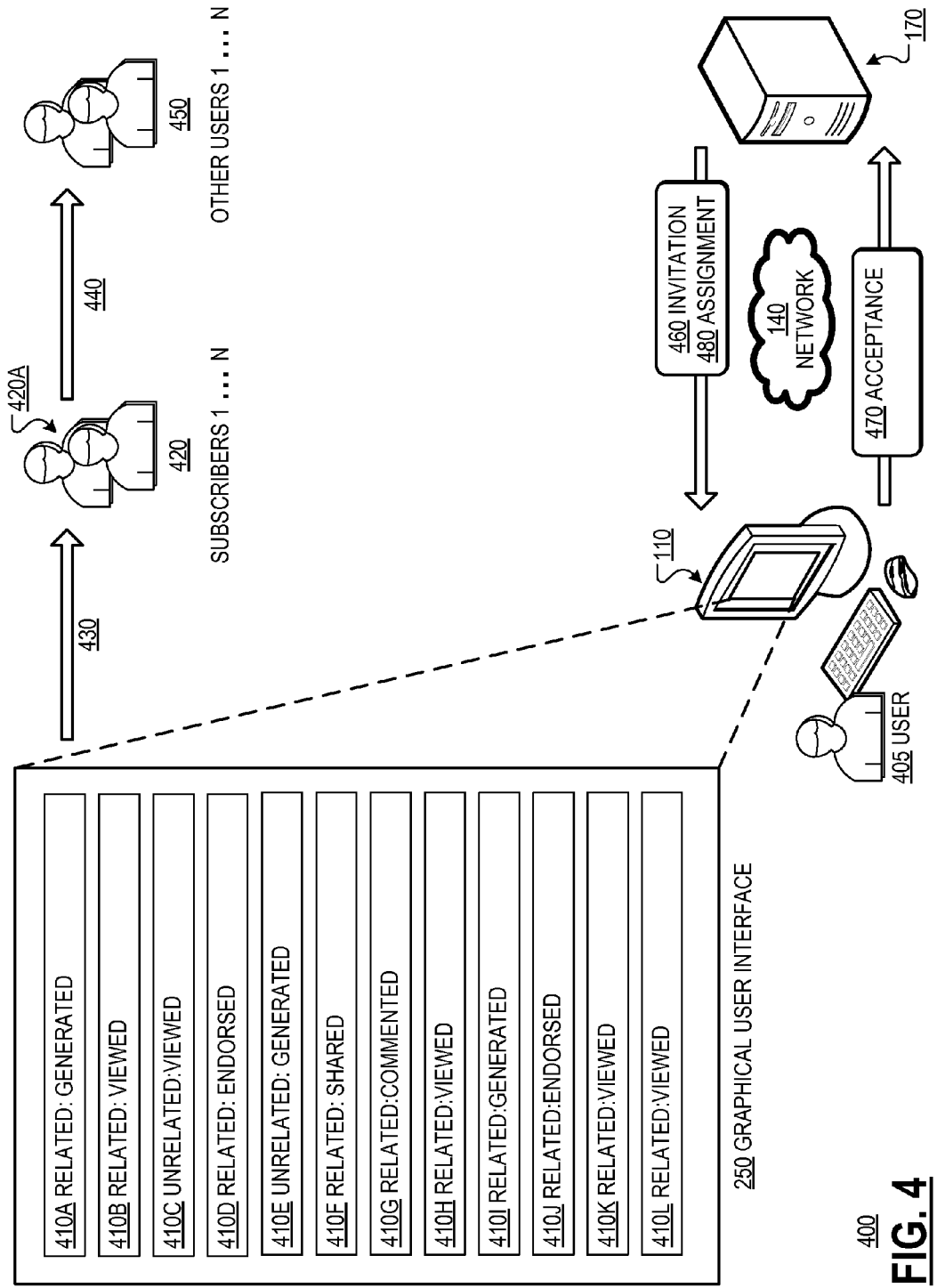
FIG. 4 conceptually illustrates one approach to implementing the process of FIG. 3.

An example will now be described using the example of the process 300 of FIG. 3. In this example, illustrated in FIG. 4, a user 405 is using a desktop computer 110 to interact with the social media platform, via a graphical user interface 250. In the course of his interaction, the user 405 generates content (e.g., posts, notes, updates, etc.), comments upon content, endorses (e.g., by giving a thumbs-up, etc.) content, shares content, and so on.

The user's interaction with respect to content 410A-L includes content that is generated, viewed, commented upon, shared, or endorsed by the user. For example, content 410A, 410E, and 410I, are generated by the user 405, content 410B, 410C, 410H, 410K, and 410L are viewed by the user 405, content 410D and 410J are endorsed by the user, content 410F is shared by the user, and content 410G is commented upon by the user 405.

In step 310, a leadership score of the user 405 is determined. The leadership score is based upon the user's subject matter expertise score, subject matter interest score, opinion impact score, and online activity score.

In this example, the user 405 has included details of his professional career on the social media platform. Thus, the user's 405 professional designation in real life can be taken into consideration in calculation of the user's 405 subject matter expertise score. In calculating the user's 405 subject matter interest score, the user's 405 online interaction with content 410A-L is considered. Based on an analysis of the content 410A-L, the encouragement module 282 determines that content 410A, 410B, 410D, 410F, 410G, 410H, 410I, 410J, 410K, and 410L are related to the subject matter. Based upon the user's 405 generation of content 410A and 410I, viewing of content 410B, 410H, 410K, and 410L, endorsement of content 410D and 410J, sharing of content 410F, and commenting upon 410G, the user's 405 subject matter interest score is determined.

The user's 405 interaction with the various content items 410A-L can be viewed by the user's 405 subscribers 420. The user 405 may have any number (e.g., N) of subscribers 420. One of the items of content 410A generated by the user 405, is received via a social update subscription 430, and re-shared 440 by one of the user's subscribers 420A. The re-shared content 410A is then received via a social update 440 by other users 450 who are subscribed to receive updates from subscriber 420. There may be any number (e.g., N) of other users 450. Thus, the content item 410A generated by the user 405 is viewed by the user's subscribers 420, and in turn, other users 450. The user's 405 opinion impact score can be calculated based upon various statistics of the initial viewing 430 by the user's subscribers 420, and by the other users 450.

The user's 405 online activity score is calculated, in this example, based upon the timestamps, and frequency distribution of content items 410A-L.

In Step 320, Based upon the user's 405 subject matter expertise score, subject matter interest score, opinion impact score, and online activity score, the encouragement module 282 provides an invitation 460 to be sent to the user 405. The invitation 460 is for the user 405 to create a new online group dedicated to the subject matter, on the social media platform.

In Step 330, the user 405 accepts the invitation. An indication, 470 of the user's acceptance is received by the encouragement module 282.

In Step 340, based upon the received indication 470 of acceptance, the encouragement module 282 assigns 480 administrative privileges within the online group. In this example, the administrative privileges correspond to a designation of a moderator, which may be considered a leadership position, within the online group.

Figure 5:
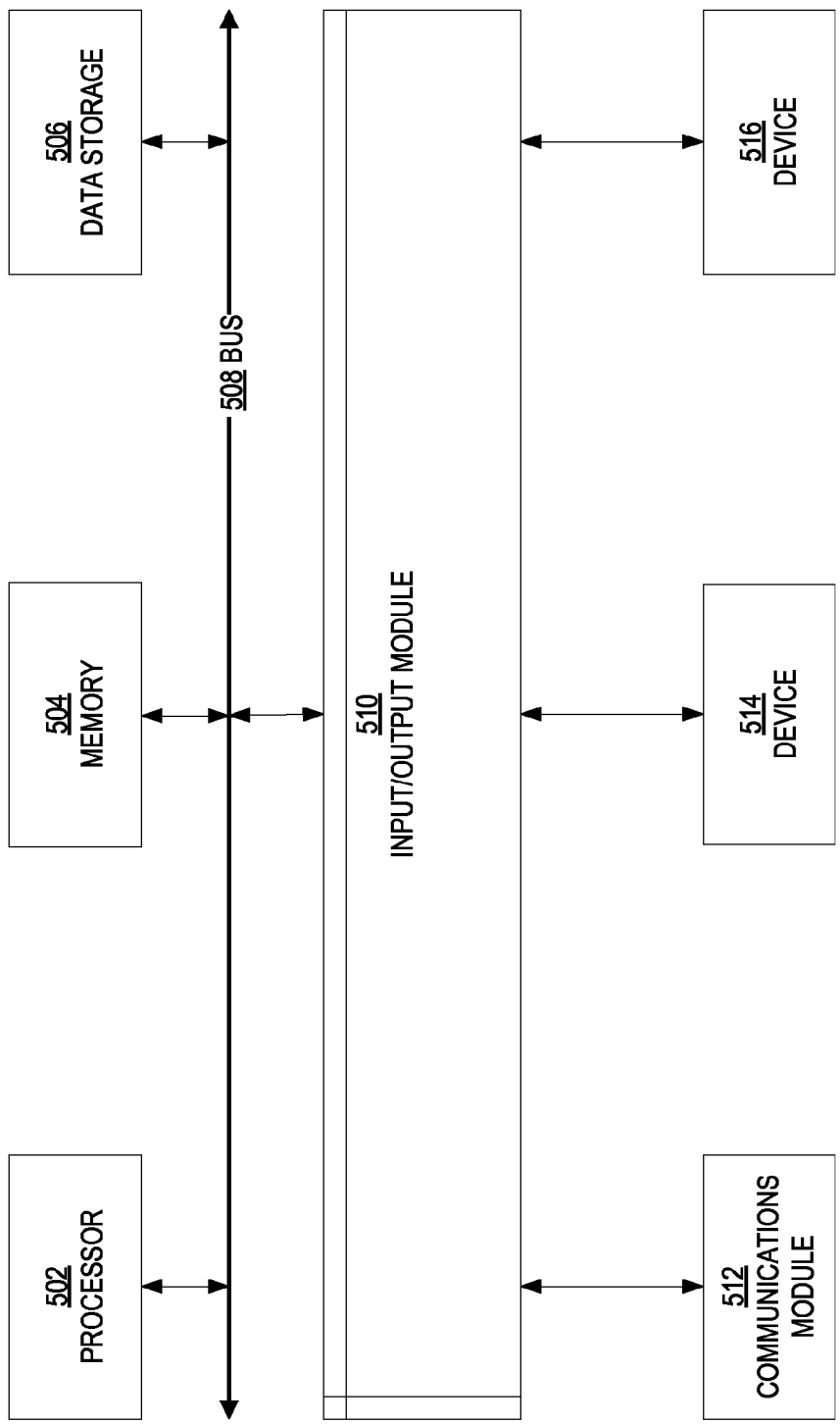
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk, optical disk, or solid state disk coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client computing devices and servers. A client computing device and server are generally remote from each other and typically interact through a communication network. The relationship of client computing device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method for designating a leader of an online group in an online social media platform operating on the Internet, the method comprising:
   calculating, using one or more processors, an opinion impact score based on a number of times that one or more links shared by an individual associated with the online social media platform were re-shared by one or more of other individuals associated with the online social media platform;
   calculating a subject matter expertise score representative of the individual's level of expertise in a subject matter of the online group based on a publication at least partially authored by the individual and using an online server that associates publications with individuals;
   calculating, using the one or more processors, a subject matter interest score representative of the individual's interest in the subject matter, the individual's interest in the subject matter being increased when the individual is a member of two or more online groups that are related to the subject matter based on a level of correlation between the subject matter and subject matter of the two or more online groups, the two or more online groups each comprising different subject matter;
   determining, using the one or more processors, a leadership score based on the calculating of the subject matter expertise score, the opinion impact score, and the subject matter interest score, the leadership score corresponding to a level of correlation between the individual and a leadership role for the online group relating to a subject matter;

providing, based on the leadership score, an invitation to be sent to the individual, wherein the invitation is for assuming the leadership role associated with the online group relating to the subject matter;

receiving indication of an acceptance of the invitation for assuming the leadership role associated with the online group relating to the subject matter; and assigning to the individual, based on the received indication of the acceptance, the leadership role associated with the online group relating to the subject matter.

2. The method of claim 1, further comprising:

providing for sending to an administrative user, the leadership score of the individual, and an information used in the determining of the leadership score; and receiving an indication of administrative approval by the administrative user, wherein assigning to the individual of the leadership role associated with the online group relating to the subject matter is further based on the indication of administrative approval.

3. The method of claim 1, wherein the subject matter expertise score associated with the individual is further based on a professional designation of the individual, and wherein the professional designation relates to the subject matter.

4. The method of claim 1, wherein the subject matter expertise score associated with the individual is based on a publication authored by the individual, and wherein the publication relates to the subject matter.

5. The method of claim 1, wherein the subject matter expertise score associated with the individual is based on a published quote attributed to the individual, and wherein the published quote is included in the publication.

6. The method of claim 5, wherein the subject matter expertise score associated with the individual is further based on a reputation of the publication.

7. The method of claim 1, wherein the subject matter interest score corresponding to the individual corresponds to a level of interest of the individual in the subject matter.

8. The method of claim 7, wherein the subject matter interest score corresponding to the individual is based on a link to web content shared by the individual as a post or a message to others within the social media platform, and wherein the link to web content relates to the subject matter.

9. The method of claim 7, wherein the online group relating to the subject matter comprises a first online group relating to a first subject matter, wherein the individual is a member of a second online group relating to a second subject matter, and wherein the subject matter interest score is based on the first subject matter and the second subject matter, and wherein the first subject matter relates to the second subject matter.

10. The method of claim 1, wherein the opinion impact score corresponding to the individual corresponds to a level of impact of an opinion of the individual.

11. The method of claim 10, wherein the opinion impact score corresponding to the individual is based on a number of subscribers of an online account of the individual.

12. The method of claim 11, wherein the individual shares a link to web content, via the online account of the individual, with subscribers of the online account of the individual, and wherein the opinion impact score corresponding to the individual is based on a number of times that the subscribers re-share the link to the web content with others.

13. The method of claim 1, wherein the online activity score corresponds to a level of online activity of the individual.

14. The method of claim 13, wherein the online activity score is further based on a frequency with which the individual connects to the Internet.

15. The method of claim 1, wherein the online activity score is further based on a reporting by the individual of inappropriate content on the social media platform.

16. A system comprising:

a memory comprising instructions for encouraging a social media user associated with an online social medial platform operating on the Internet to assume a leadership role in a social media group relating to a subject matter, the social media group being within the online social media platform; and a processor configured to execute the instructions to:

calculate an opinion impact score based on a number of times that one or more links shared by the social media user were re-shared by one or more of other users associated with the online social media platform;

calculate a subject matter expertise score representative of the social media user's level of expertise in the subject matter based on a publication at least partially authored by the social media user and using an online server that associates publications with social media users;

calculate a subject matter interest score representative of the social media user's interest in the subject matter, the social media user's interest in the subject matter being greater when the social media user is a member of two or more online groups that are related to the subject matter based on a level of correlation between the subject matter and subject matter of the two or more online groups, the two or more online groups each comprising different subject matter;

determine a leadership score based on the calculated subject matter expertise score, opinion impact score, and subject matter interest score, the leadership score corresponding to a level of correlation between the social media user and the leadership role associated with the social media group relating to a subject matter;

provide, based on the leadership score, an invitation to be sent to the social media user, wherein the invitation is for assuming the leadership role associated with the social media group relating to the subject matter;

receive an indication of an acceptance of the invitation for assuming the leadership role associated with the social media group relating to the subject matter; and assign to the social media user, based on the received indication of the acceptance, the leadership role associated with the social media group relating to the subject matter.

17. A non-transitory machine-readable storage medium comprising machine-readable instructions for causing a processor to execute a method for designating a leader of a social media group in an online social media platform operating on the Internet, the method, the method comprising:

calculating an opinion impact score based on a number of times that one or more links shared by a social media user associated with the online social media platform were re-shared by one or more of other users associated with the online social media platform;

calculating a subject matter expertise score representative of the social media user's level of expertise in a subject matter of the social media group based on a publication at least partially authored by the social media user and using an online server that associates publications with individuals;

calculating a subject matter interest score representative of the social media user's interest in the subject matter, the social media user's interest in the subject matter being greater when the social media user is a member of two or more social media groups that are related to the subject matter based on a level of correlation between the subject matter and subject matter of the two or more online groups, the two or more social media groups each comprising different subject matter;

determining a leadership score based on the calculating of the subject matter expertise score, the opinion impact score, and the subject matter interest score, the leadership score corresponding to a correlation of the social media user and a leadership role associated with the social media group relating to a subject matter, the social media group being within the online social media platform;

providing, based on the leadership score and an indication of administrative approval by an administrative user, an invitation to be sent to the social media user, wherein the invitation is for assuming the leadership role associated with the social media group relating to the subject matter;

receiving an indication of an acceptance of the invitation for assuming the leadership role associated with the social media group relating to the subject matter; and assigning to the social media user, based on the received indication of the acceptance, the leadership role associated with the social media group relating to the subject matter.

18. A method for designating a leader of an online group in an online social media platform operating on the Internet, the method comprising:

determining, using one or more processors, an opinion impact score based on a number of times that one or more links provided by an individual associated with the online social media platform were shared by one or more of other individuals associated with the online social media platform;

determining a subject matter expertise score representative of the individual's level of expertise in a subject matter of the online group based on a publication at least partially authored by the individual and using an online server that associates publications with individuals;

determining, using the one or more processors, a subject matter interest score representative of the individual's interest in the subject matter, the individual's interest in the subject matter being greater when the individual is a member of two or more online groups that are related to the subject matter based on a level of correlation between the subject matter and subject matter of the two or more online groups, the two or more online groups each comprising different subject matter;

determining, using the one or more processors, a leadership score based on the determined subject matter expertise score, the opinion impact score, and the subject matter interest score, the leadership score corresponding to a level of correlation between the individual and a leadership role associated with the online group relating to a subject matter, the individual and the online group being associated with the online social media platform;

providing, based on the leadership score, an invitation to be sent to the individual, wherein the invitation is for assuming the leadership role associated with the online group relating to the subject matter;

receiving indication of an acceptance of the invitation for assuming the leadership role associated with the online group relating to the subject matter; and assigning to the individual, based on the received indication of the acceptance, the leadership role associated with the online group relating to the subject matter.

* * * * *